US 12,550,199 B2

(12) United States Patent
Si et al.

(10) Patent No.: US 12,550,199 B2
(45) Date of Patent: Feb. 10, 2026

(54) METHOD AND APPARATUS OF CHANNEL ACCESS PROCEDURE PRIORITY ON SIDELINK

(71) Applicant: Samsung Electronics Co., Ltd., Suwon-si (KR)

(72) Inventors: Hongbo Si, Plano, TX (US); Emad N. Farag, Flanders, NJ (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 18/188,299

(22) Filed: Mar. 22, 2023

(65) Prior Publication Data

US 2023/0319903 A1    Oct. 5, 2023

Related U.S. Application Data

(60) Provisional application No. 63/326,589, filed on Apr. 1, 2022, provisional application No. 63/326,610, filed on Apr. 1, 2022.

(51) Int. Cl.
*H04W 74/08* (2024.01)
*H04W 72/1263* (2023.01)
*H04W 74/0808* (2024.01)

(52) U.S. Cl.
CPC ... *H04W 74/0875* (2013.01); *H04W 72/1263* (2013.01); *H04W 74/0808* (2013.01)

(58) Field of Classification Search
CPC ......... H04W 74/0875; H04W 72/1263; H04W 74/0808
See application file for complete search history.

(56) References Cited

U.S. PATENT DOCUMENTS

2020/0100285 A1*  3/2020  Roy ............... H04W 74/0808
2020/0267761 A1   8/2020  Lee et al.
(Continued)

FOREIGN PATENT DOCUMENTS

WO    2021163411 A1    8/2021
WO    2021212354 A1   10/2021

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Ajay Cattungal

(57) ABSTRACT

Methods and apparatuses for channel access procedure priority on a sidelink (SL) in a wireless communication system. A method of a user equipment (UE) includes determining a type of a SL channel access procedure before a SL transmission, which is a Type 1 SL channel access procedure or a Type 2 SL channel access procedure, and determining, based on a type of the SL transmission, a channel access priority class (CAPC) when the type of the SL channel access procedure is the Type 1 SL channel access procedure, wherein the CAPC is associated with a parameter p. The method further includes performing, based on the type of the SL channel access procedure and the CAPC, the SL channel access procedure before the SL transmission and performing the SL transmission if the SL channel access procedure is successfully performed.

20 Claims, 8 Drawing Sheets

(56) References Cited

U.S. PATENT DOCUMENTS

| | | | |
|---|---|---|---|
| 2021/0051572 A1* | 2/2021 | Roy | H04L 5/0094 |
| 2021/0051718 A1* | 2/2021 | Bhattad | H04W 72/23 |
| 2021/0235512 A1* | 7/2021 | Lee | H04W 48/02 |
| 2021/0400721 A1* | 12/2021 | Luo | H04W 80/02 |
| 2021/0400732 A1* | 12/2021 | Xue | H04L 5/14 |
| 2022/0022246 A1* | 1/2022 | Luo | H04W 72/046 |
| 2022/0150967 A1* | 5/2022 | Wang | H04W 74/0866 |
| 2023/0132437 A1* | 5/2023 | Lei | H04L 5/0091 370/329 |
| 2023/0389088 A1* | 11/2023 | Xue | H04W 74/0875 |
| 2024/0244629 A1* | 7/2024 | Noh | H04W 72/23 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Jun. 29, 2023 regarding International Application No. PCT/KR2023/004319, 7 pages.

Moderator (Qualcomm Incorporated), "FL summary of channel access mechanism for 52.6GHZ-71GHz band, ver02", 3GPP TSG RAN WG1 Meeting #108-e, R1-2202685, Mar. 2022, 175 pages.

Extended European Search Report issued May 22, 2025 regarding Application No. 23781414.0, 8 pages.

* cited by examiner

METHOD AND APPARATUS OF CHANNEL ACCESS PROCEDURE PRIORITY ON SIDELINK

CROSS-REFERENCE TO RELATED APPLICATIONS AND CLAIM OF PRIORITY

The present application claims priority to U.S. Provisional Patent Application No. 63/326,589, filed on Apr. 1, 2022, and U.S. Provisional Patent Application No. 63/326,610, filed on Apr. 1, 2022. The contents of the above-identified patent document is incorporated herein by reference.

TECHNICAL FIELD

The present disclosure relates generally to wireless communication systems and, more specifically, the present disclosure relates to a channel access procedure priority on a sidelink (SL) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a channel access procedure priority on an SL in a wireless communication system.

In one embodiment, a user equipment (UE) in a wireless communication system is provided. The UE includes a processor configured to determine a type of a SL channel access procedure before a SL transmission, wherein the type of the SL channel access procedure is a Type 1 SL channel access procedure or a Type 2 SL channel access procedure; determine, based on a type of the SL transmission, a channel access priority class (CAPC) when the type of the SL channel access procedure is the Type 1 SL channel access procedure, wherein the CAPC is associated with a parameter p; and perform, based on the type of the SL channel access procedure and the CAPC, the SL channel access procedure before the SL transmission. the UE further includes a transceiver operably coupled to the processor, the transceiver configured to perform the SL transmission if the SL channel access procedure is successfully performed.

In another embodiment, a method of a UE in a wireless communication system is provided. The method includes determining a type of a SL channel access procedure before a SL transmission, wherein the type of the SL channel access procedure is a Type 1 SL channel access procedure or a Type 2 SL channel access procedure, and determining, based on a type of the SL transmission, a CAPC when the type of the SL channel access procedure is the Type 1 SL channel access procedure, wherein the CAPC is associated with a parameter p. The method further includes performing, based on the type of the SL channel access procedure and the CAPC, the SL channel access procedure before the SL transmission and performing the SL transmission if the SL channel access procedure is successfully performed.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, embodiments of the present disclosure may also be applied to deployment of 5G communication systems, 6G or even later releases which may use terahertz (THz) bands.

Figure 1:
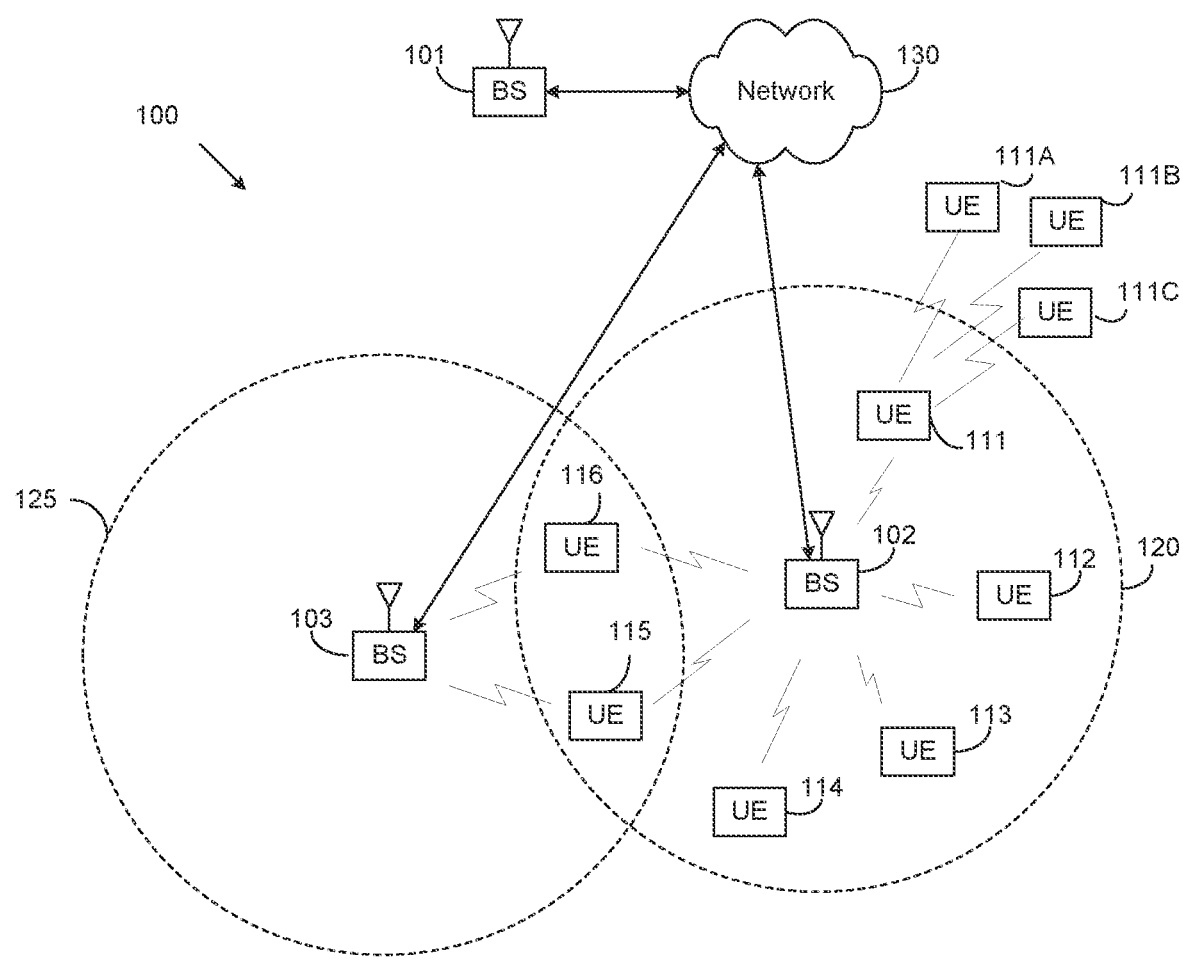
FIG. 1 illustrates an example of wireless network according to embodiments of the present disclosure.
Figure 2:
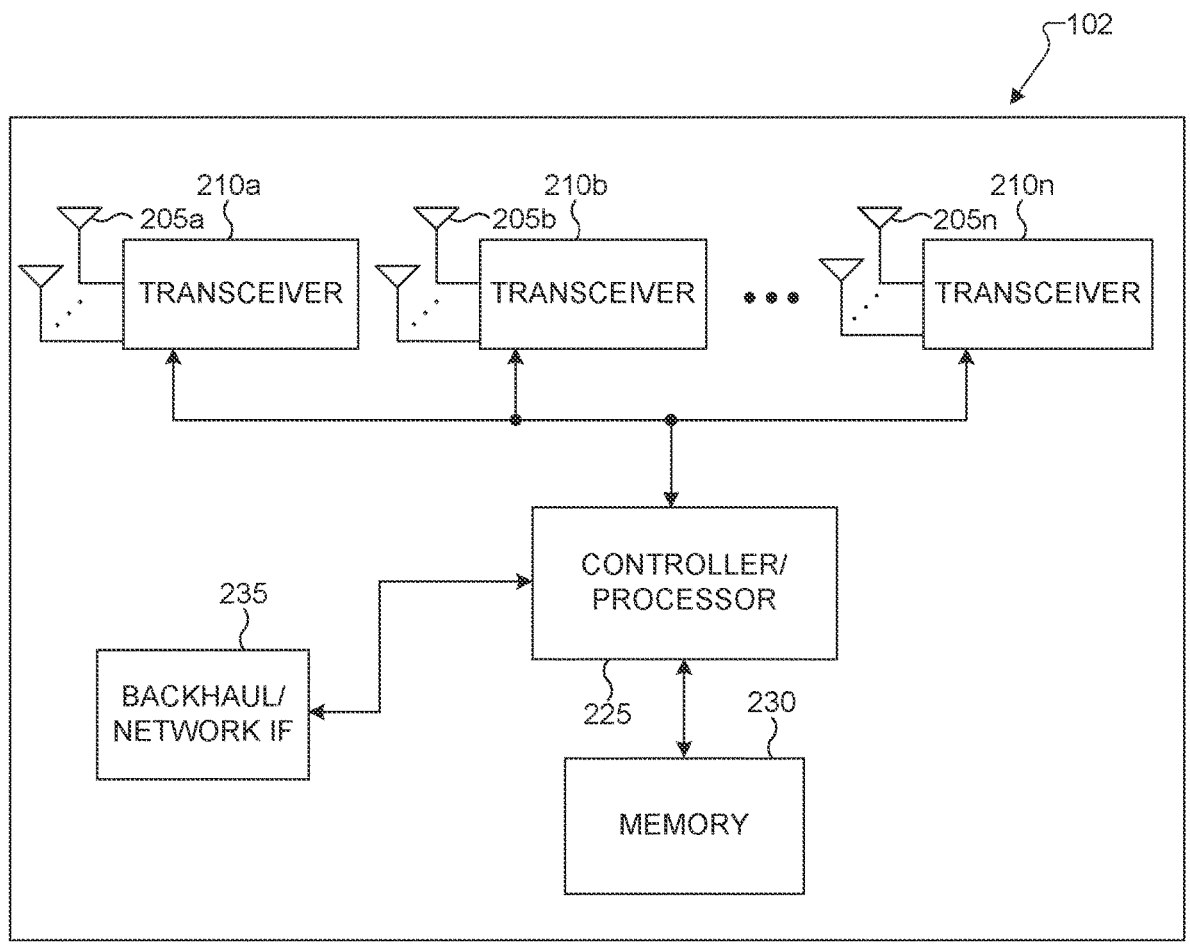
FIG. 2 illustrates an example of gNB according to embodiments of the present disclosure.
Figure 3:
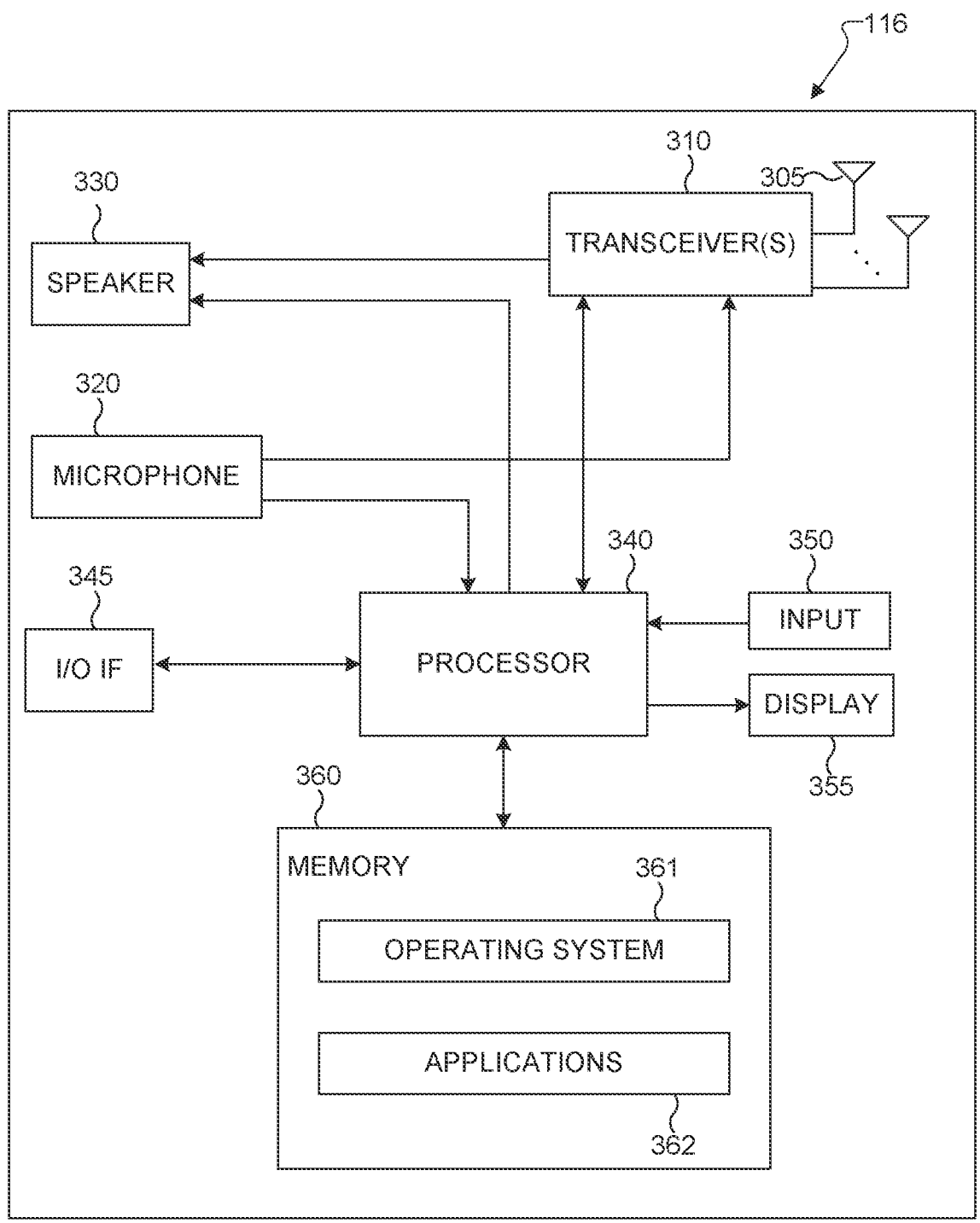
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a channel access procedure priority on an SL in a wireless communication system. In certain embodiments, and one or more of the gNBs 101-103 includes circuitry, programing, or a combination thereof, for supporting a channel access procedure priority on an SL in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for a channel access procedure priority on an SL in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a channel access procedure priority on an SL in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
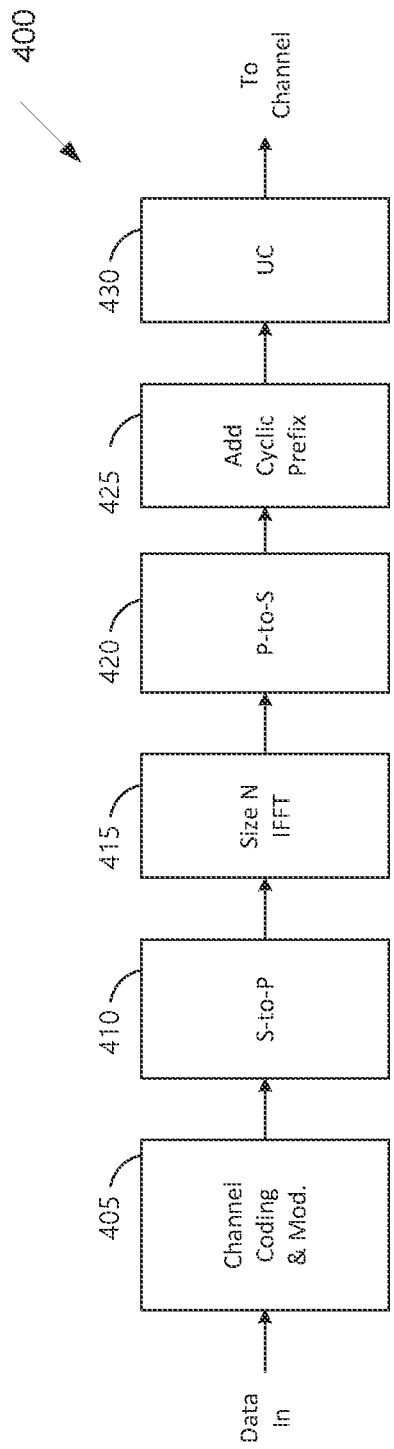
FIGS. 4 and 5 illustrate example of wireless transmit and receive paths according to the present disclosure.
Figure 5:
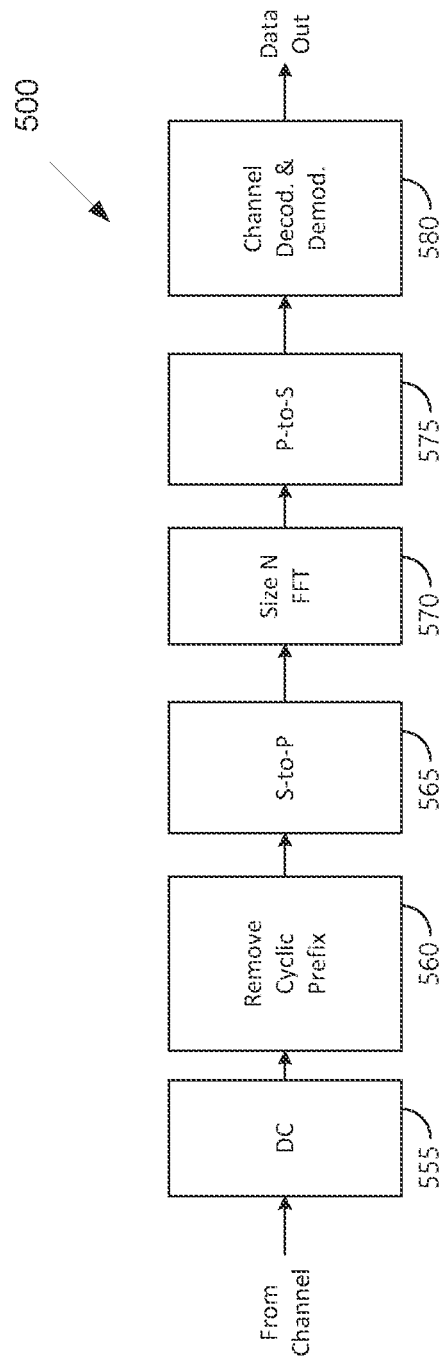

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support channel access procedure priority on an SL in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
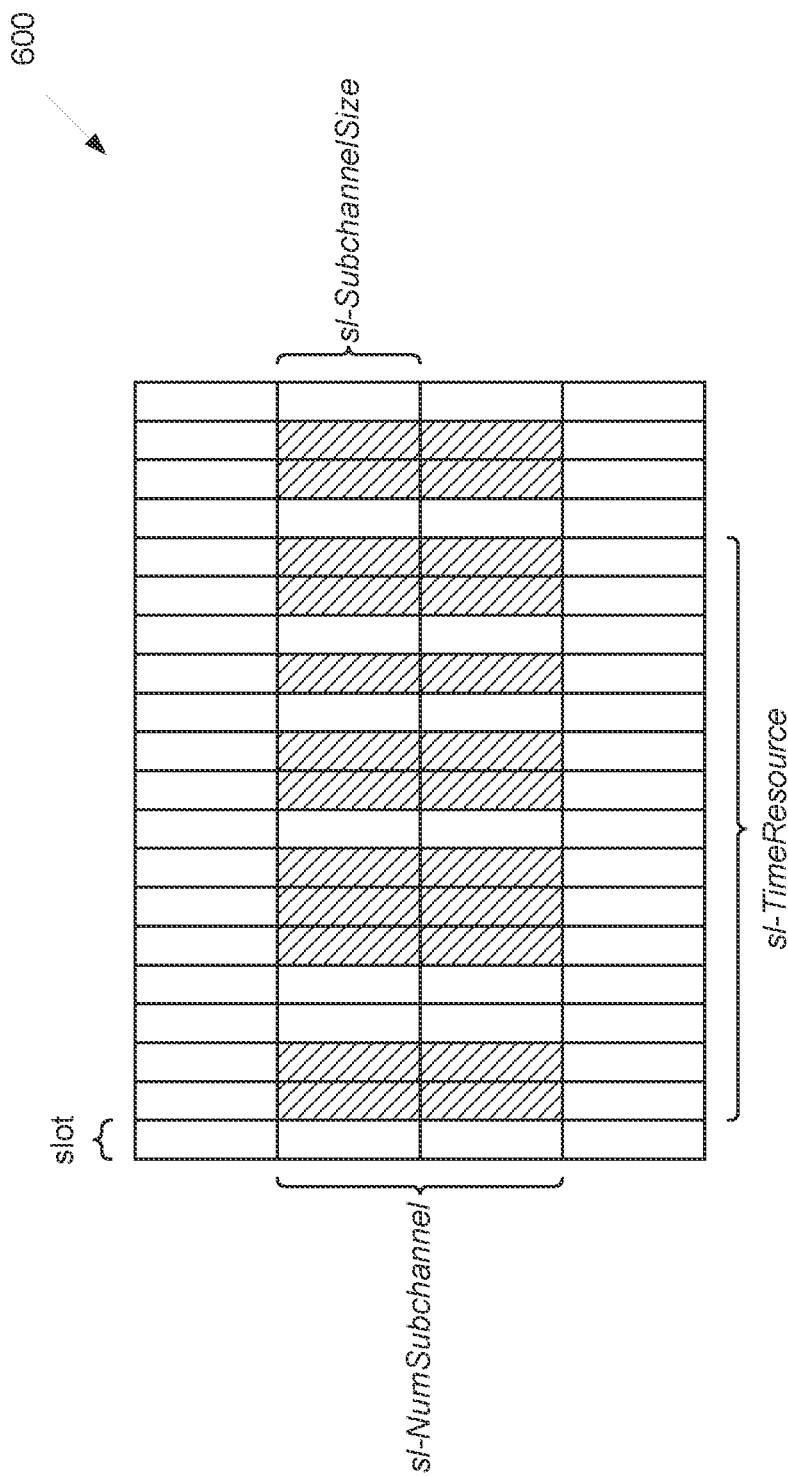
FIG. 6 illustrates an example of a resource pool in Rel-16 NR V2X according to embodiments of the present disclosure.

FIG. 6 illustrates an example of a resource pool in Rel-16 NR vehicle-to-everything (V2X) 600 cording to embodiments of the present disclosure. An embodiment of the resource pool in Rel-16 NR V2X 600 shown in FIG. 6 is for illustration only.

In Rel-16 NR V2X, transmission and reception of SL signals and channels are based on resource pool(s) confined in the configured SL bandwidth part (BWP). In the frequency domain, a resource pool includes a (pre-)configured number (e.g., sl-NumSubchannel) of contiguous sub-channels, wherein each sub-channel includes a set of contiguous resource blocks (RBs) in a slot with size (pre-)configured by higher layer parameter (e.g., sl-SubchannelSize). In time domain, slots in a resource pool occur with a periodicity of 10240 ms, and slots including S-SSB, non-UL slots, and reserved slots are not applicable for a resource pool. The set of slots for a resource pool is further determined within the remaining slots, based on a (pre-)configured bitmap (e.g., sl-TimeResource). An illustration of a resource pool is shown in FIG. 6.

FIG. 6 illustrates an example of a resource pool in Rel-16 NR V2X 600 according to embodiments of the present disclosure. An embodiment of the resource pool in Rel-16 NR V2X 600 shown in FIG. 6 is for illustration only.

Transmission and reception of physical sidelink shared channel (PSSCH), physical sidelink control channel (PSCCH), and physical sidelink feedback channel (PSFCH) are confined within and associated with a resource pool, with parameters (pre-)configured by higher layers (e.g., SL-PSSCH-Config, SL-PSCCH-Config, and SL-PSFCH-Config, respectively).

A UE may transmit the PSSCH in consecutive symbols within a slot of the resource pool, and PSSCH resource allocation starts from the second symbol configured for sidelink, e.g., startSLsymbol+1, and the first symbol configured for sidelink is duplicated from the second configured for sidelink, for automatic gain control (AGC) purpose. The UE may not transmit PSSCH in symbols not configured for sidelink, or in symbols configured for PSFCH, or in the last symbol configured for sidelink, or in the symbol immediately preceding the PSFCH. The frequency domain resource allocation unit for PSSCH is the sub-channel, and the sub-channel assignment is determined using the corresponding field in the associated SCI.

A prioritization operation can be supported for a sidelink transmission or reception, and a priority of a sidelink transmission or reception is given a value from 1 or 8, wherein a smaller value corresponds to a higher priority. A priority of S-SS/PSBCH block transmission or reception is provided by sl-SSB-PriorityNR. For a PSFCH transmission or reception with HARQ-ACK information, a priority value for the PSFCH is equal to the priority value indicated by an SCI format 1-A associated with the PSFCH. For PSFCH transmission with conflict information, a priority value for the PSFCH is equal to the smallest priority value determined by the corresponding SCI formats 1-A for the conflicting resources.

For a PSFCH reception with conflict information, a priority value for the PSFCH is equal to the priority value determined by the corresponding SCI format 1-A for the conflicting resource.

In Rel-16 NR-U, for an operation with shared spectrum channel access (e.g., unlicensed or shared spectrum), a transmitter may perform a sensing operation that evaluates the availability of a channel for performing transmissions.

Two types of channel access procedure are supported, wherein Type 1 channel access procedure includes a random time duration spanned by sensing slots that are sensed to be idle before the SL transmission and is associated with a random sensing duration, and Type 2 channel access procedure includes a deterministic time duration spanned by sensing slots that are sensed to be idle before the SL transmission is associated with a deterministic sensing duration, wherein e.g., the deterministic sensing duration can be shorter than the random sensing duration. The Type 2 channel access procedure can be further classified into Type 2A, Type 2B, and Type 2C channel access procedure, wherein the classification is based on the sensing duration, e.g., 25 us, 16 us, and 0 us for Type 2A, Type 2B, and Type 2C channel access procedure, respectively. 4 different priorities (e.g., denoted by a parameter $p \in \{1, 2, 3, 4\}$) are supported for the Type 1 channel access procedure, and a higher channel access priority class (CAPC) (e.g., a smaller value of p) corresponds to a shorter sensing duration and a shorter maximum channel occupancy time.

For a sidelink operated over an unlicensed spectrum, the transmission of sidelink signals and channels may be subject to the channel access procedure, and a priority of sidelink transmission or reception can contribute to the determination of the channel access procedure. The present disclosure focuses on the determining the priority for channel access procedure for unlicensed operation (e.g., an operation with shared spectrum channel access).

The present disclosure provides a determination of channel access procedure type based on at least one of a type of the sidelink transmission or the priority of the sidelink transmission. More precisely, the present disclosure includes the following components: (1) determining Type 2 channel access procedure based on the sidelink transmission type; (2) determining Type 1 channel access procedure based on the sidelink transmission type; (3) determining the channel access procedure based on sidelink priority; and (4) example UE procedure.

In one embodiment, the channel access procedure can be determined based on the type of sidelink transmission.

In one embodiment, Type 2 channel access procedure can be used for at least one type of sidelink signal/channel according to at least one of the following examples. For one instance, the applicability of using Type 2 channel access procedure for the example at least one type of sidelink signal/channel can be fixed in the system specification (e.g., a default value that can be (pre-)configured, or a fixed value with no further configuration). For another instance, the applicability of using Type 2 channel access procedure for the example at least one type of sidelink signal/channel can be (pre-)configured (e.g., pre-configuration and/or configuration by Uu RRC and/or configuration by PC5 RRC). For yet another instance, the applicability of using Type 2 channel access procedure for the example at least one type of sidelink signal/channel can be indicated by MAC CE (e.g., Uu MAC CE and/or PC5 MAC CE).

For yet another instance, the applicability of using Type 2 channel access procedure for the example at least one type of sidelink signal/channel can be indicated by a control information format (e.g., a DCI format and/or a SCI format and/or UCI).

In one example, the transmission of S-SS/PSBCH block(s) can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the S-SS/PSBCH block(s) transmission.

For one instance, the use of Type 2 channel access procedure can be further subject to a restriction that the S-SS/PSBCH block transmission is not multiplexed with other transmission.

For one instance, the use of Type 2 channel access procedure can be further up to a restriction on the priority of the S-SS/PSBCH transmission.

For another example, the transmission of PSFCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the PSFCH transmission.

For one instance, the use of Type 2 channel access procedure can be further subject to a restriction that the PSFCH transmission is not multiplexed with other transmission.

For one instance, the transmission of PSFCH with HARQ-ACK information can have shorter sensing duration with Type 2 channel access procedure comparing to the transmission of PSFCH with conflict information.

For another instance, the use of Type 2 channel access procedure can only be applicable for PSFCH transmission with HARQ-ACK information, e.g., not applicable for PSFCH transmission with conflict information.

For one instance, the use of Type 2 channel access procedure can be further up to a restriction on the cast type of the associated PSSCH transmission for the PSFCH transmission (e.g., broadcast and/or groupcast).

For yet another example, the transmission of PSSCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the PSSCH transmission.

For one instance, the use of Type 2 channel access procedure can be further subject to a restriction that the PSSCH transmission is not multiplexed with other transmissions.

For one instance, the use of Type 2 channel access procedure can be further up to a restriction on the priority of the PSSCH transmission.

For one instance, the use of Type 2 channel access procedure can be further up to a restriction on the cast type of the PSSCH transmission (e.g., broadcast and/or groupcast).

For yet another example, the transmission of PSCCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the PSCCH transmission.

For one instance, the use of Type 2 channel access procedure can be further subject to a restriction that the PSCCH transmission is not multiplexed with other transmissions.

For one instance, the use of Type 2 channel access procedure can be further up to a restriction on the priority of the PSCCH transmission.

For one instance, the use of Type 2 channel access procedure can be further up to a restriction on the cast type of the PSCCH transmission (e.g., broadcast and/or groupcast).

For yet another example, the transmission of multiplexed PSSCH and PSCCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the multiplexed PSSCH and PSCCH transmission.

For one instance, the use of Type 2 channel access procedure can be further subject to a restriction that the multiplexed PSSCH and PSCCH transmission is not further multiplexed with other transmissions.

For one instance, the use of Type 2 channel access procedure can be further up to a restriction on the priority of the multiplexed PSSCH and PSCCH transmission.

For one instance, the use of Type 2 channel access procedure can be further up to a restriction on the cast type of the PSSCH transmission (e.g., broadcast and/or groupcast) in the multiplexed PSSCH and PSCCH transmission.

For one instance, the use of Type 2 channel access procedure can be further up to a restriction on the cast type of the PSCCH transmission (e.g., broadcast and/or groupcast) in the multiplexed PSSCH and PSCCH transmission.

For yet another example, the transmission of CSI-RS can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the CSI-RS transmission.

For one instance, the use of Type 2 channel access procedure can be further subject to a restriction that the CSI-RS transmission is not multiplexed with other transmissions.

For one instance, the use of Type 2 channel access procedure can be further up to a restriction on the priority of the CSI-RS transmission.

For yet another example, the transmission of multiplexed CSI-RS with at least one of a PSCCH or PSSCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the multiplexed transmission.

For one instance, the use of Type 2 channel access procedure can be further subject to a restriction that the multiplexed transmission is not further multiplexed with other transmissions.

For one instance, the use of Type 2 channel access procedure can be further up to a restriction on the priority of the multiplexed transmission.

For one instance, the use of Type 2 channel access procedure can be further up to a restriction on the cast type of the PSSCH transmission (e.g., broadcast and/or groupcast) in the multiplexed transmission.

For one instance, the use of Type 2 channel access procedure can be further up to a restriction on the cast type of the PSCCH transmission (e.g., broadcast and/or groupcast) in the multiplexed transmission.

For yet another example, the transmission of PT-RS can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the PT-RS transmission.

For one instance, the use of Type 2 channel access procedure can be further subject to a restriction that the PT-RS transmission is not multiplexed with other transmissions.

For one instance, the use of Type 2 channel access procedure can be further up to a restriction on the priority of the PT-RS transmission.

For yet another example, the transmission of multiplexed PT-RS with at least one of a PSCCH or PSSCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the multiplexed transmission.

For one instance, the use of Type 2 channel access procedure can be further subject to a restriction that the multiplexed transmission is not further multiplexed with other transmission.

For one instance, the use of Type 2 channel access procedure can be further up to a restriction on the priority of the multiplexed transmission.

For one instance, the use of Type 2 channel access procedure can be further up to a restriction on the cast type of the PSSCH transmission (e.g., broadcast and/or groupcast) in the multiplexed transmission.

For one instance, the use of Type 2 channel access procedure can be further up to a restriction on the cast type of the PSCCH transmission (e.g., broadcast and/or groupcast) in the multiplexed transmission.

For yet another example, the transmission of a reference signal for positioning on the sidelink interface (e.g., referred to as sidelink positioning reference signal, S-PRS) can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the S-PRS transmission.

For one instance, the use of Type 2 channel access procedure can be further subject to a restriction that the S-PRS transmission is not multiplexed with other transmission.

For one instance, the use of Type 2 channel access procedure can be further up to a restriction on the priority of the S-PRS transmission.

For yet another example, the transmission of multiplexed S-PRS with at least one of a PSCCH or PSSCH can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the multiplexed transmission.

For one instance, the use of Type 2 channel access procedure can be further subject to a restriction that the multiplexed transmission is not further multiplexed with other transmission.

For one instance, the use of Type 2 channel access procedure can be further up to a restriction on the priority of the multiplexed transmission.

For one instance, the use of Type 2 channel access procedure can be further up to a restriction on the cast type of the PSSCH transmission (e.g., broadcast and/or groupcast) in the multiplexed transmission.

For one instance, the use of Type 2 channel access procedure can be further up to a restriction on the cast type of the PSCCH transmission (e.g., broadcast and/or groupcast) in the multiplexed transmission.

For yet another example, the transmission of multiplexed S-PRS with S-SS/PSBCH block can utilize Type 2 channel access procedure.

For one instance, the Type 2 channel access procedure can be Type 2A channel access procedure. For another instance, the Type 2 channel access procedure can be Type 2B channel access procedure. For yet another instance, the Type 2 channel access procedure can be Type 2C channel access procedure.

For one instance, the use of Type 2 channel access procedure can be further up to a restriction on the duty cycle and/or transmission duration of the multiplexed transmission.

For one instance, the use of Type 2 channel access procedure can be further subject to a restriction that the multiplexed transmission is not further multiplexed with other transmission.

For one instance, the use of Type 2 channel access procedure can be further up to a restriction on the priority of the multiplexed transmission.

In another embodiment, Type 1 channel access procedure with high CAPC can be used for at least one type of sidelink signal/channel according to at least one of the following examples. For one instance, the applicability of using Type 1 channel access procedure with high CAPC for the example at least one type of sidelink signal/channel can be fixed in the system specification (e.g., a default value that can be (pre-)configured, or a fixed value with no further configuration). For another instance, the applicability of using Type 1 channel access procedure with high CAPC for the example at least one type of sidelink signal/channel can be (pre-)configured (e.g., pre-configuration and/or configuration by Uu RRC and/or configuration by PC5 RRC).

For yet another instance, the applicability of using Type 1 channel access procedure with high CAPC for the example at least one type of sidelink signal/channel can be indicated by MAC CE (e.g., Uu MAC CE or PC5 MAC CE). For yet another instance, the applicability of using Type 2 channel access procedure for the example at least one type of sidelink signal/channel can be indicated by a control information format (e.g., a DCI format and/or a SCI format and/or UCI)

For one embodiment, if multiple sidelink signal(s)/channel(s) are multiplexed in a burst for sidelink transmission, and applicable for Type 1 channel access procedure as described in this disclosure, the CAPC of the channel access procedure for the burst can be determined based on the lowest CAPC of the sidelink signal(s)/channel(s) multiplexed in the burst.

For one example, the transmission of S-SS/PSBCH block can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the S-SS/PSBCH block transmission.

For one instance, the use of Type 1 channel access procedure with high CAPC can be further subject to a restriction that the S-SS/PSBCH block transmission is not multiplexed with other transmissions.

For one instance, the use of Type 1 channel access procedure with high CAPC can be further up to a restriction on the priority of the S-SS/PSBCH transmission.

For another example, the transmission of PSFCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the PSFCH transmission.

For one instance, the use of Type 1 channel access procedure with high CAPC can be further subject to a restriction that the PSFCH transmission is not multiplexed with other transmission.

For one instance, the transmission of PSFCH with HARQ-ACK information can have higher CAPC in the Type 1 channel access procedure comparing to the transmission of PSFCH with conflict information.

For another instance, the use of Type 1 channel access procedure with high CAPC can only be applicable for PSFCH transmission with HARQ-ACK information, e.g., not applicable for PSFCH transmission with conflict information.

For one instance, the use of Type 1 channel access procedure with high CAPC can be further up to a restriction on the cast type of the associated PSSCH transmission for the PSFCH transmission (e.g., broadcast and/or groupcast).

For yet another example, the transmission of PSSCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the PSSCH transmission.

For one instance, the use of Type 1 channel access procedure with high CAPC can be further subject to a restriction that the PSSCH transmission is not multiplexed with other transmission.

For one instance, the use of Type 1 channel access procedure with high CAPC can be further up to a restriction on the priority of the PSSCH transmission.

For one instance, the use of Type 1 channel access procedure with high CAPC can be further up to a restriction on the cast type of the PSSCH transmission (e.g., broadcast and/or groupcast).

For yet another example, the transmission of PSCCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the PSCCH transmission.

For one instance, the use of Type 1 channel access procedure with high CAPC can be further subject to a restriction that the PSCCH transmission is not multiplexed with other transmission.

For one instance, the use of Type 1 channel access procedure with high CAPC can be further up to a restriction on the priority of the PSCCH transmission.

For yet another example, the transmission of multiplexed PSSCH and PSCCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the multiplexed PSSCH and PSCCH transmission.

For one instance, the use of Type 1 channel access procedure with high CAPC can be further subject to a restriction that the multiplexed PSSCH and PSCCH transmission is not further multiplexed with other transmission.

For one instance, the use of Type 1 channel access procedure with high CAPC can be further up to a restriction on the priority of the multiplexed PSSCH and PSCCH transmission.

For one instance, the use of Type 1 channel access procedure with high CAPC can be further up to a restriction on the cast type of the PSSCH transmission (e.g., broadcast and/or groupcast) in the multiplexed PSSCH and PSCCH transmission.

For yet another example, the transmission of CSI-RS can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the CSI-RS transmission.

For one instance, the use of Type 1 channel access procedure with high CAPC can be further subject to a restriction that the CSI-RS transmission is not multiplexed with other transmission.

For one instance, the use of Type 1 channel access procedure with high CAPC can be further up to a restriction on the priority of the CSI-RS transmission.

For yet another example, the transmission of multiplexed CSI-RS with at least one of a PSCCH or PSSCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the multiplexed transmission.

For one instance, the use of Type 1 channel access procedure with high CAPC can be further subject to a restriction that the multiplexed transmission is not further multiplexed with other transmissions.

For one instance, the use of Type 1 channel access procedure with high CAPC can be further up to a restriction on the priority of the multiplexed transmission.

For one instance, the use of Type 1 channel access procedure with high CAPC can be further up to a restriction on the cast type of the PSSCH transmission (e.g., broadcast and/or groupcast) in the multiplexed transmission.

For yet another example, the transmission of PT-RS can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the PT-RS transmission.

For one instance, the use of Type 1 channel access procedure with high CAPC can be further subject to a restriction that the PT-RS transmission is not multiplexed with other transmission.

For one instance, the use of Type 1 channel access procedure with high CAPC can be further up to a restriction on the priority of the PT-RS transmission. [01%] For yet another example, the transmission of multiplexed PT-RS with at least one of a PSCCH or PSSCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the multiplexed transmission.

For one instance, the use of Type 1 channel access procedure with high CAPC can be further subject to a restriction that the multiplexed transmission is not further multiplexed with other transmissions.

For one instance, the use of Type 1 channel access procedure with high CAPC can be further up to a restriction on the priority of the multiplexed transmission.

For one instance, the use of Type 1 channel access procedure with high CAPC can be further up to a restriction on the cast type of the PSSCH transmission (e.g., broadcast and/or groupcast) in the multiplexed transmission.

For yet another example, the transmission of sidelink positioning reference signal (S-PRS) can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the S-PRS transmission.

For one instance, the use of Type 1 channel access procedure with high CAPC can be further subject to a restriction that the S-PRS transmission is not multiplexed with other transmissions.

For one instance, the use of Type 1 channel access procedure with high CAPC can be further up to a restriction on the priority of the S-PRS transmission.

For yet another example, the transmission of multiplexed S-PRS with at least one of a PSCCH or PSSCH can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the multiplexed transmission.

For one instance, the use of Type 1 channel access procedure with high CAPC can be further subject to a restriction that the multiplexed transmission is not further multiplexed with other transmissions.

For one instance, the use of Type 1 channel access procedure with high CAPC can be further up to a restriction on the priority of the multiplexed transmission.

For one instance, the use of Type 1 channel access procedure with high CAPC can be further up to a restriction on the cast type of the PSSCH transmission (e.g., broadcast and/or groupcast) in the multiplexed transmission.

For yet another example, the transmission of multiplexed S-PRS with S-SS/PSBCH block can utilize Type 1 channel access procedure with high CAPC.

For one instance, the high CAPC is the highest CAPC (e.g., p=1). For another instance, the high CAPC is one from the highest two CAPCs (e.g., p=1 or p=2). For yet another instance, the high CAPC is one from the highest three CAPCs (e.g., p=1 or p=2 or p=3).

For one instance, the use of Type 1 channel access procedure with high CAPC can be further up to a restriction on the duty cycle and/or transmission duration of the multiplexed transmission.

For one instance, the use of Type 1 channel access procedure with high CAPC can be further subject to a restriction that the multiplexed transmission is not further multiplexed with other transmissions.

For one instance, the use of Type 1 channel access procedure with high CAPC can be further up to a restriction on the priority of the multiplexed transmission.

In one embodiment, the channel access procedure can be determined based on the sidelink priority (e.g., transmission priority).

For one example, there can be a mapping between the sidelink priority (e.g., transmission priority) and the channel access procedure. For one example, a set of high sidelink priorities (e.g., small value of sidelink priorities) corresponds to Type 2 channel access procedure, and a set of low sidelink priorities (e.g., large value of sidelink priorities) corresponds to Type 1 channel access procedure. For another example, the higher sidelink priorities (e.g., small value of sidelink priorities) correspond to Type 1 channel access procedure with higher CAPC (e.g., smaller value of p), and the lower sidelink priorities (e.g., large value of sidelink priorities) correspond to Type 1 channel access procedure with lower CAPC (e.g., larger value of p).

Figure 7:
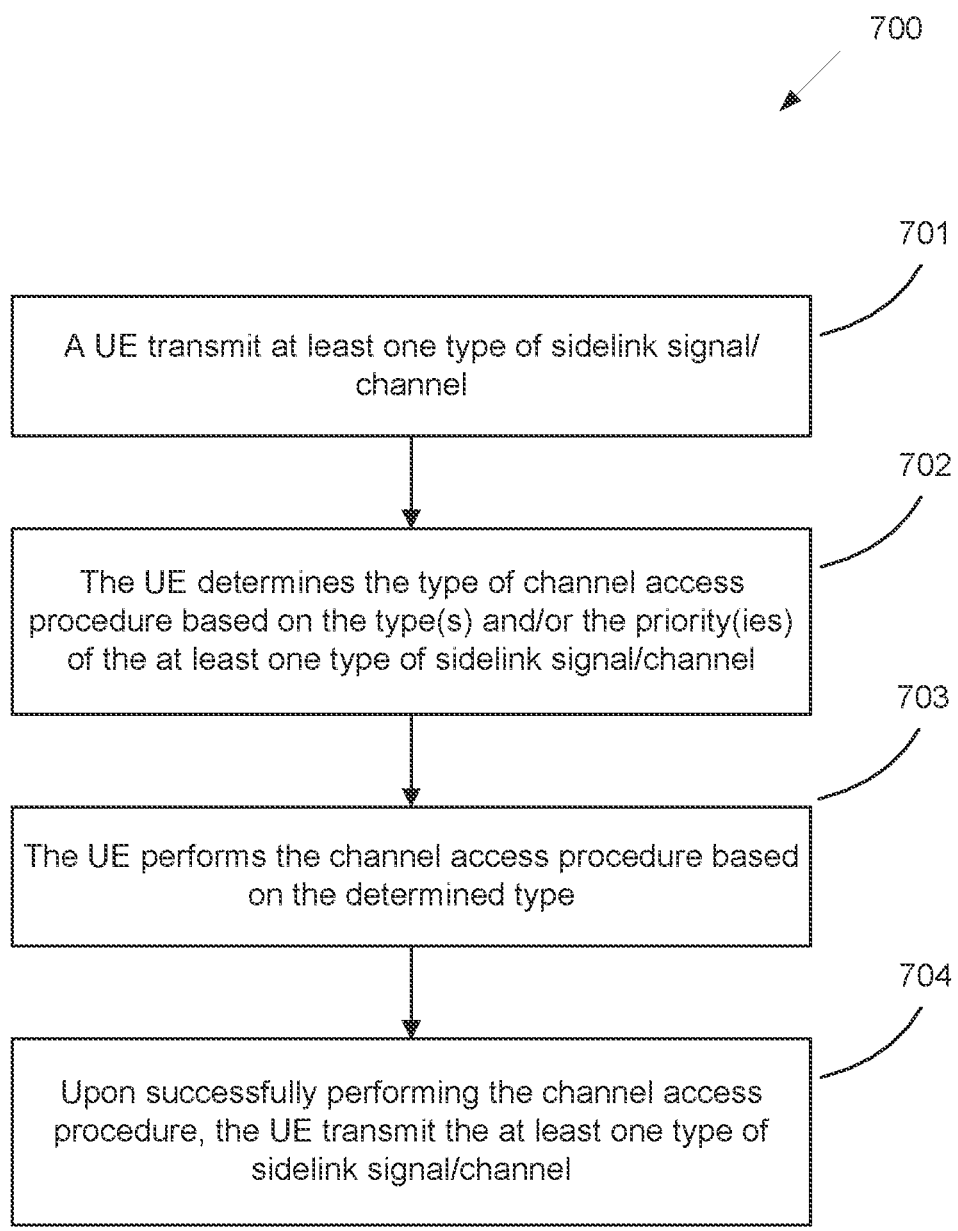
FIG. 7 illustrates a flowchart of UE procedure for determining the channel access procedure type according to embodiments of the present disclosure.

FIG. 7 illustrates a flowchart of UE procedure 700 for determining the channel access procedure type according to embodiments of the present disclosure. For example, the UE procedure 700 as may be performed by a UE such as 111-116 as illustrated in FIG. 1. An embodiment of the UE procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

An example UE procedure for determining the type of channel access procedure is illustrated in FIG. 7. A UE may transmit at least one type of sidelink signal/channel (701), and the UE determines the type of channel access procedure based on the type(s) and/or the priority(ies) of the at least one type of sidelink signal/channel (702). The UE performs the channel access procedure based on the determined type of channel access procedure (703), and upon successfully performing the channel access procedure, the UE transmit the at least one type of sidelink signal/channel (704).

For a sidelink operated over an unlicensed spectrum, the transmission of sidelink signals and channels may be subject to the channel access procedure, and priority of sidelink transmission or reception can be enhanced to take into account the impact from channel access procedure. The present disclosure focuses on the enhancement to sidelink priority at least for unlicensed operation, but not limited to unlicensed operation.

The present disclosure provides a determination of sidelink transmission or reception based on the priority of the sidelink transmission. Also, the present disclosure includes adaptation of sidelink priority based on the transmission occasion of the sidelink signal/channel.

In one embodiment, if a UE may transmit a first set of sidelink signal(s)/channel(s) (e.g., the number is denoted as $N_{TX}$, and the highest priority value is denoted as $P_{TX}$) and may receive a second set of sidelink signal(s)/channel(s) (e.g., the number is denoted as $N_{RX}$, and the highest priority value is denoted as $P_{RX}$), and the transmission of the first set of sidelink signal(s)/channel(s) may overlap in time with the reception of the second set of sidelink signal(s)/channel(s), the UE can determine either to transmit or receive the corresponding set of sidelink signal(s)/channel(s) based on the sidelink priority, potentially subject to at least one example condition described in this disclosure. In one embodiment, the priority values are taking from {1, 2, . . . , 8}, wherein a smaller value corresponds to a higher priority.

In one example condition, for an operation with shared spectrum channel access, if the channel access procedure associated with the transmission of the first set of sidelink signal(s)/channel(s) fails (e.g., the channel is not sensed as idle in the channel access procedure), the UE may drop the transmission of the first set of sidelink signal(s)/channel(s) and may receive the second set of sidelink signal(s)/channel(s), regardless of the sidelink priority relationship between the first set of sidelink signal(s)/channel(s) and the second set of sidelink signal(s)/channel(s) as described in the present disclosure. For one further example, the examples of utilizing the sidelink priority relationship between the first set of sidelink signal(s)/channel(s) and the second set of sidelink signal(s)/channel(s) to determine transmission or reception, as described in the present disclosure, are applicable when the channel access procedure associated with the transmission of the first set of sidelink signal(s)/channel(s) succeeds (e.g., the channel is sensed as idle in the channel access procedure).

In another example condition, for an operation with shared spectrum channel access, if the first set of sidelink signal(s)/channel(s) is not within a channel occupancy, the UE may drop the transmission of the first set of sidelink signal(s)/channel(s) and may receive the second set of sidelink signal(s)/channel(s), regardless of the sidelink priority relationship between the first set of sidelink signal(s)/channel(s) and the second set of sidelink signal(s)/channel(s) as described in this disclosure. For one instance, the channel occupancy is initialized by the UE after performing a channel access procedure. For another instance, the channel occupancy is shared from another UE or gNB, and the channel occupancy information is known to the UE. For one further example, the examples of utilizing the sidelink priority relationship between the first set of sidelink signal(s)/channel(s) and the second set of sidelink signal(s)/channel(s) to determine transmission or reception, as described in the present disclosure, are applicable when the first set of sidelink signal(s)/channel(s) is within a channel occupancy (e.g., initiated by the UE or shared from another UE).

For another example, the first set of sidelink signal(s)/channel(s) are with the same type(s) as the second set of sidelink signal(s)/channel(s).

For one instance, the first set of sidelink signal(s)/channel(s) can include PSFCH, and the second set of sidelink signal(s)/channel(s) can also include PSFCH.

For another instance, the first set of sidelink signal(s)/channel(s) can include PSSCH, and the second set of sidelink signal(s)/channel(s) can also include PSSCH.

For yet another instance, the first set of sidelink signal(s)/channel(s) can include PSCCH, and the second set of sidelink signal(s)/channel(s) can also include PSCCH.

For yet another instance, the first set of sidelink signal(s)/channel(s) can include S-SS/PSBCH block, and the second set of sidelink signal(s)/channel(s) can also include S-SS/PSBCH block.

For yet another instance, the first set of sidelink signal(s)/channel(s) can include CSI-RS, and the second set of sidelink signal(s)/channel(s) can also include CSI-RS.

For yet another instance, the first set of sidelink signal(s)/channel(s) can include PT-RS, and the second set of sidelink signal(s)/channel(s) can also include PT-RS.

For yet another instance, the first set of sidelink signal(s)/channel(s) can include the reference signal for positioning on sidelink interface (referred to as sidelink positioning reference signal, S-PRS, in this disclosure), and the second set of sidelink signal(s)/channel(s) can also include (S-PRS).

For yet another instance, the first set of sidelink signal(s)/channel(s) can include multiplexed PSSCH and PSCCH, and the second set of sidelink signal(s)/channel(s) can also include multiplexed PSSCH and PSCCH.

For yet another instance, the first set of sidelink signal(s)/channel(s) can include PSFCH multiplexed with at least one of PSSCH or PSCCH, and the second set of sidelink signal(s)/channel(s) can also include PSFCH multiplexed with at least one of PSSCH or PSCCH.

For yet another instance, the first set of sidelink signal(s)/channel(s) can include CSI-RS multiplexed with at least one of PSSCH or PSCCH, and the second set of sidelink signal(s)/channel(s) can also include CSI-RS multiplexed with at least one of PSSCH or PSCCH.

For yet another instance, the first set of sidelink signal(s)/channel(s) can include PT-RS multiplexed with at least one of PSSCH or PSCCH, and the second set of sidelink signal(s)/channel(s) can also include PT-RS multiplexed with at least one of PSSCH or PSCCH.

For yet another instance, the first set of sidelink signal(s)/channel(s) can include S-PRS multiplexed with at least one of PSSCH or PSCCH, and the second set of sidelink signal(s)/channel(s) can also include S-PRS multiplexed with at least one of PSSCH or PSCCH.

For yet another instance, the first set of sidelink signal(s)/channel(s) can include S-PRS multiplexed with S-SS/PSBCH block, and the second set of sidelink signal(s)/channel(s) can also include S-PRS multiplexed with S-SS/PSBCH block.

For yet another instance, the first set of sidelink signal(s)/channel(s) can include components in discover burst, and the second set of sidelink signal(s)/channel(s) can also include components in a discover burst.

For another example, the first set of sidelink signal(s)/channel(s) can be with the different type(s) from the second set of sidelink signal(s)/channel(s).

For one instance, the first set of sidelink signal(s)/channel(s) can include S-SS/PSBCH block, and the second set of sidelink signal(s)/channel(s) can include at least one from or a multiplexing of multiple from PSSCH, PSCCH, PSFCH, CSI-RS, PT-RS, or S-PRS.

For another instance, the first set of sidelink signal(s)/channel(s) can include PSFCH, and the second set of sidelink signal(s)/channel(s) can include at least one from or a multiplexing of multiple from S-SS/PSBCH block, PSSCH, PSCCH, CSI-RS, PT-RS, or S-PRS.

For yet another instance, the first set of sidelink signal(s)/channel(s) can include PSSCH, and the second set of sidelink signal(s)/channel(s) can include at least one from or a multiplexing of multiple from S-SS/PSBCH block, PSFCH, PSCCH, CSI-RS, PT-RS, or S-PRS.

For yet another instance, the first set of sidelink signal(s)/channel(s) can include PSCCH, and the second set of sidelink signal(s)/channel(s) can include at least one from or a multiplexing of multiple from S-SS/PSBCH block, PSFCH, PSSCH, CSI-RS, PT-RS, or S-PRS.

For yet another instance, the first set of sidelink signal(s)/channel(s) can include CSI-RS, and the second set of sidelink signal(s)/channel(s) can include at least one from or a multiplexing of multiple from S-SS/PSBCH block, PSFCH, PSSCH, PSCCH, PT-RS, or S-PRS.

For yet another instance, the first set of sidelink signal(s)/channel(s) can include PT-RS, and the second set of sidelink signal(s)/channel(s) can include at least one from or a multiplexing of multiple from S-SS/PSBCH block, PSFCH, PSSCH, PSCCH, CSI-RS, or S-PRS.

For yet another instance, the first set of sidelink signal(s)/channel(s) can include S-PRS, and the second set of sidelink signal(s)/channel(s) can include at least one from or a multiplexing of multiple from S-SS/PSBCH block, PSFCH, PSSCH, PSCCH, CSI-RS, or PT-RS.

For yet another example, at least one of the transmission of the first set of sidelink signal(s)/channel(s) or the reception of the second set of sidelink signal(s)/channel(s) can be within a channel occupancy. For one instance, the channel occupancy is initialized by the UE after performing a channel access procedure. For another instance, the channel occupancy is shared from another UE or gNB, and the channel occupancy information is known to the UE.

For yet another example, at least one of the first set of signal(s)/channel(s) or the second set of signal(s)/channel(s) is multiplexed within a discovery burst. For instance, at least one of the first set of signal(s)/channel(s) or the second set of signal(s)/channel(s) can be multiplexed with a S-SS/PSBCH block and transmitted together.

For one embodiment, the UE may transmit the first set of sidelink signal(s)/channel(s) and drop the reception of the second set of sidelink signal(s)/channel(s), if $P_{TX} \leq P_{RX}$; and the UE may receive the second set of sidelink signal(s)/channel(s) and drop the transmission of the first set of sidelink signal(s)/channel(s), otherwise.

For another embodiment, the UE may receive the second set of sidelink signal(s)/channel(s) and drop the transmission of the first set of sidelink signal(s)/channel(s), if $P_{RX} \leq P_{TX}$; and the UE may transmit the first set of sidelink signal(s)/channel(s) and drop the reception of the second set of sidelink signal(s)/channel(s), otherwise.

For yet another embodiment, the UE may transmit the first set of sidelink signal(s)/channel(s) and drop the reception of the second set of sidelink signal(s)/channel(s), if $P_{TX}-P_{RX} \leq P_{thres}$; and the UE may receive the second set of sidelink signal(s)/channel(s) and drop the transmission of the first set of sidelink signal(s)/channel(s), otherwise.

For one example, $P_{thres}$ can be a non-positive integer fixed in the specification, e.g., $P_{thres}$ can be a fixed value as 0, or −1, or −2, or −3, or −4, or −5, or −6, or −7.

For another example, $P_{thres}$ can be a (pre-)configured non-positive integer, e.g., $P_{thres}$ can be (pre-)configured from {0, −1, −2, . . . , −7}.

For yet another example, $P_{thres}$ can be an integer to be selected from two values subject to a (pre-)configuration, e.g., $P_{thres}$ can be 1 if the (pre-)configuration is not provided, and can be a value fixed as one from {0, −1, −2, . . . , −7} if the (pre-)configuration is provided.

For yet another example, $P_{thres}$ can use a default integer e.g., $P_{thres}$ can be 1, if a (pre-)configuration is not provided, and can be determined based on the (pre-)configuration, if the (pre-)configuration is provided.

For one example, $P_{thres}$ can be a positive integer fixed in the specification, e.g., $P_{thres}$ can be a fixed value as 1, or 2, or 3, or 4, or 5, or 6, or 7.

For another example, $P_{thres}$ can be a (pre-)configured positive integer, e.g., $P_{thres}$ can be (pre-)configured from {1, 2, . . . , 7}.

For yet another example, $P_{thres}$ can be an integer to be selected from two values subject to a (pre-)configuration, e.g., $P_{thres}$ can be −1 if the (pre-)configuration is not provided, and can be a value fixed as one from {1, 2, . . . , 7} if the (pre-)configuration is provided.

For yet another example, $P_{thres}$ can use a default integer e.g., $P_{thres}$ can be −1, if a (pre) configuration is not provided, and can be determined based on the (pre-)configuration, if the (pre-) configuration is provided.

Figure 8:
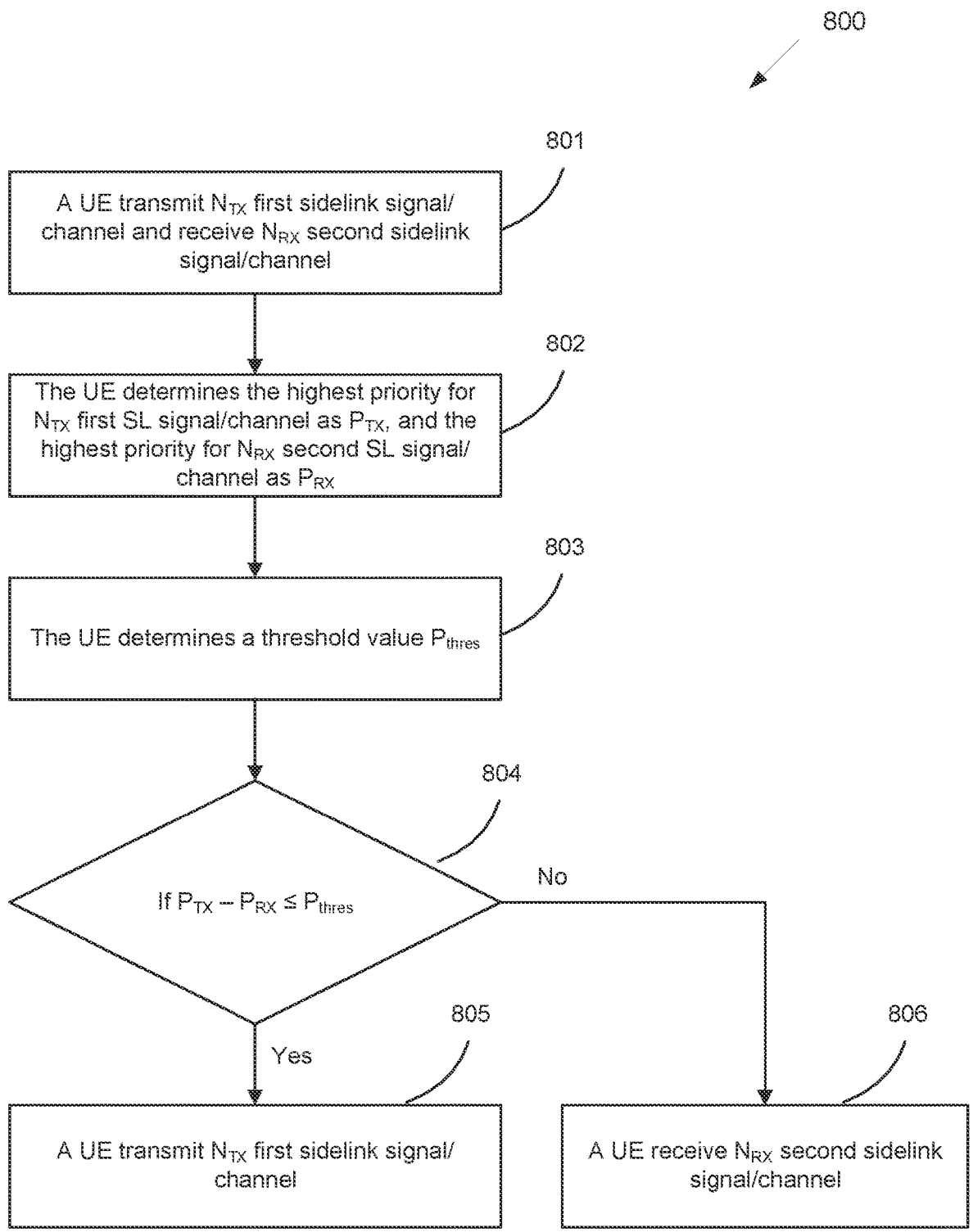
FIG. 8 illustrates a flowchart of UE procedure for determining transmission/reception based on SL priority according to embodiments of the present disclosure.

FIG. 8 illustrates a flowchart of UE procedure 800 for determining transmission/reception based on SL priority according to embodiments of the present disclosure. For example, the UE procedure 800 as may be performed by a UE such as 111-116 as illustrated in FIG. 1. An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in step 801, a UE transmits $N_{TX}$ first sidelink signal/channel and receive $N_{RX}$ second sidelink signal/channel. In step 802, the UE determines the highest priority for $N_{TX}$ first SL signal/channel as $P_{TX}$, and the highest priority for $N_{RX}$ second SL signal/channel as PRX. In step 803, the UE determines a threshold value $P_tS$. In step 804, the UE determines if $P_{TX}-P_{RX} \leq P_{thres}$. In step 805, the UE transmit $N_{TX}$ first sidelink signal/channel. ≤ In step 806, the UE receives $N_{RX}$ second sidelink signal/channel.

For yet another embodiment, the UE may receive the second set of sidelink signal(s)/channel(s) and drop the transmission of the first set of sidelink signal(s)/channel(s), if $P_{RX}-P_{TX} \leq P_{thres}$; and transmit the first set of sidelink signal(s)/channel(s) and drop the reception of the second set of sidelink signal(s)/channel(s), otherwise.

For one example, $P_{thres}$ can be a non-positive integer fixed in the specification, e.g., $P_{thres}$ can be a fixed value as 0, or −1, or −2, or −3, or −4, or −5, or −6, or −7.

For another example, $P_{thres}$ can be a (pre-)configured non-positive integer, e.g., $P_{thres}$ can be (pre-)configured from {0, −1, −2, . . . , −7}.

For yet another example, $P_{thres}$ can be an integer to be selected from two values subject to a (pre-)configuration, e.g., $P_{thres}$ can be 1 if the (pre-)configuration is not provided, and can be a value fixed as one from {0, −1, −2, . . . , −7} if the (pre-)configuration is provided.

For yet another example, $P_{thres}$ can use a default integer e.g., $P_{thres}$ can be 1, if a (pre-)configuration is not provided, and can be determined based on the (pre-)configuration, if the (pre-)configuration is provided.

For one example, $P_{thres}$ can be a positive integer fixed in the specification, e.g., $P_{thres}$ can be a fixed value as 1, or 2, or 3, or 4, or 5, or 6, or 7.

For another example, $P_{thres}$ can be a (pre-)configured positive integer, e.g., $P_{thres}$ can be (pre-)configured from {1, 2, ..., 7}.

For yet another example, $P_{thres}$ can be an integer to be selected from two values subject to a (pre-)configuration, e.g., $P_{thres}$ can be −1 if the (pre-)configuration is not provided, and can be a value fixed as one from {1, 2, ..., 7} if the (pre-)configuration is provided.

For yet another example, $P_{thres}$ can use a default integer e.g., $P_{thres}$ can be −1, if a (pre-)configuration is not provided, and can be determined based on the (pre-)configuration, if the (pre-)configuration is provided.

For another example of the embodiment, the UE may transmit the first set of sidelink signal(s)/channel(s) and drop the reception of the second set of sidelink signal(s)/channel(s), if $P_{TX} \leq P_{thres}$; and the UE may receive the second set of sidelink signal(s)/channel(s) and drop the transmission of the first set of sidelink signal(s)/channel(s), otherwise.

For one example, $P_{thres}$ can be a positive integer fixed in the specification, e.g., $P_{thres}$ can be a fixed value as 1, or 2, or 3, or 4, or 5, or 6, or 7, or 8. For one instance, $P_{thres}=8$ is equivalent as no requirement on the priority of the first set of sidelink signal(s)/channel(s).

For another example, $P_{thres}$ can be a (pre-)configured positive integer, e.g., $P_{thres}$ can be (pre-)configured from {1, 2, ..., 7, 8}.

For yet another example, $P_{thres}$ can use a default integer e.g., $P_{thres}$ can be 8, if a (pre-)configuration is not provided, and can be determined based on the (pre-)configuration, if the (pre-)configuration is provided.

For another embodiment, the UE may receive the second set of sidelink signal(s)/channel(s) and drop the transmission of the first set of sidelink signal(s)/channel(s), if $P_{RX} \leq P_{thres}$; and the UE may transmit the first set of sidelink signal(s)/channel(s) and drop the reception of the second set of sidelink signal(s)/channel(s), otherwise.

For one example, $P_{thres}$ can be a positive integer fixed in the specification, e.g., $P_{thres}$ can be a fixed value as 1, or 2, or 3, or 4, or 5, or 6, or 7, or 8. For one instance, $P_{thres}=8$ is equivalent as no requirement on the priority of the first set of sidelink signal(s)/channel(s).

For another example, $P_{thres}$ can be a (pre-)configured positive integer, e.g., $P_{thres}$ can be (pre-)configured from {1, 2, ..., 7, 8}.

For yet another example, $P_{thres}$ can use a default integer e.g., $P_{thres}$ can be 8, if a (pre-)configuration is not provided, and can be determined based on the (pre-)configuration, if the (pre-)configuration is provided.

For yet another example of the embodiment, the UE may transmit the first set of sidelink signal(s)/channel(s) and drop the reception of the second set of sidelink signal(s)/channel(s), if $P_{TX} \leq P_{thres1}$ and/or $P_{TX} - P_{RX} \leq P_{thres2}$; and the UE may receive the second set of sidelink signal(s)/channel(s) and drop the transmission of the first set of sidelink signal(s)/channel(s), otherwise.

For one example, $P_{thres1}$ can be a positive integer fixed in the specification, e.g., $P_{thres1}$ can be a fixed value as 1, or 2, or 3, or 4, or 5, or 6, or 7, or 8. For one instance, $P_{thres1}=8$ is equivalent as no requirement on the priority of the first set of sidelink signal(s)/channel(s).

For another example, $P_{thres1}$ can be a (pre-)configured positive integer, e.g., $P_{thres1}$ can be (pre-)configured from {1, 2, ..., 7, 8}.

For yet another example, $P_{thres1}$ can use a default integer e.g., $P_{thres}$ can be 8, if a (pre-)configuration is not provided, and can be determined based on the (pre-)configuration, if the (pre-)configuration is provided.

For one example, $P_{thres2}$ can be a non-positive integer fixed in the specification, e.g., $P_{thres2}$ can be a fixed value as −1, or −2, or −3, or −4, or −5, or −6, or −7.

For another example, $P_{thres2}$ can be a (pre-)configured non-positive integer, e.g., $P_{thres2}$ can be (pre-)configured from {-1, -2, ..., -7}.

For yet another example, $P_{thres2}$ can be an integer to be selected from two values subject to a (pre-)configuration, e.g., $P_{thres2}$ can be 1 if the (pre-)configuration is not provided, and can be a value fixed as one from {-1, -2, ..., -7} if the (pre-)configuration is provided.

For yet another example, $P_{thres2}$ can use a default integer e.g., $P_{thres}$ can be 1, if a (pre-)configuration is not provided, and can be determined based on the (pre-)configuration, if the (pre-)configuration is provided.

For one example, $P_{thres2}$ can be a positive integer fixed in the specification, e.g., $P_{thres2}$ can be a fixed value as 1, or 2, or 3, or 4, or 5, or 6, or 7.

For another example, $P_{thres2}$ can be a (pre-)configured positive integer, e.g., $P_{thres}2$ can be (pre-)configured from {1, 2, ..., 7}.

For yet another example, $P_{thres2}$ can be an integer to be selected from two values subject to a (pre-)configuration, e.g., $P_{thres2}$ can be −1 if the (pre-)configuration is not provided, and can be a value fixed as one from {1, 2, ..., 7} if the (pre-)configuration is provided.

For yet another example, $P_{thres2}$ can use a default integer e.g., $P_{thres}$ can be 1, if a (pre-)configuration is not provided, and can be determined based on the (pre-)configuration, if the (pre-)configuration is provided.

For yet another example of the embodiment, the UE may receive the second set of sidelink signal(s)/channel(s) and drop the transmission of the first set of sidelink signal(s)/channel(s), if $P_{RX} \leq P_{thres1}$ and/or $P_{RX} - P_{TX} \leq P_{thres2}$; and the UE may transmit the first set of sidelink signal(s)/channel(s) and drop the reception of the second set of sidelink signal(s)/channel(s), otherwise.

For one example, $P_{thres1}$ can be a positive integer fixed in the specification, e.g., $P_{thres1}$ can be a fixed value as 1, or 2, or 3, or 4, or 5, or 6, or 7, or 8. For one instance, $P_{thres1}=8$ is equivalent as no requirement on the priority of the first set of sidelink signal(s)/channel(s).

For another example, $P_{thres1}$ can be a (pre-)configured positive integer, e.g., $P_{thres1}$ can be (pre-)configured from {1, 2, ..., 7, 8}.

For yet another example, $P_{thres1}$ can use a default integer e.g., $P_{thres}$ can be 8, if a (pre-)configuration is not provided, and can be determined based on the (pre-)configuration, if the (pre-)configuration is provided.

For one example, $P_{thres2}$ can be a non-positive integer fixed in the specification, e.g., $P_{thres2}$ can be a fixed value as −1, or −2, or −3, or −4, or −5, or −6, or −7.

For another example, $P_{thres2}$ can be a (pre-)configured non-positive integer, e.g., $P_{thres2}$ can be (pre-)configured from {-1, -2, ..., -7}.

For yet another example, $P_{thres2}$ can be an integer to be selected from two values subject to a (pre-)configuration, e.g., $P_{thres2}$ can be 1 if the (pre-)configuration is not provided, and can be a value fixed as one from {-1, -2, ..., -7} if the (pre-)configuration is provided.

For yet another example, $P_{thres2}$ can use a default integer e.g., $P_{thres}$ can be 1, if a (pre-)configuration is not provided, and can be determined based on the (pre-)configuration, if the (pre-)configuration is provided.

For one example, $P_{thres2}$ can be a positive integer fixed in the specification, e.g., $P_{thres2}$ can be a fixed value as 1, or 2, or 3, or 4, or 5, or 6, or 7.

For another example, $P_{thres2}$ can be a (pre-)configured positive integer, e.g., $P_{thres}2$ can be (pre-)configured from {1, 2, . . . , 7}.

For yet another example, $P_{thres2}$ can be an integer to be selected from two values subject to a (pre-)configuration, e.g., $P_{thres2}$ can be −1 if the (pre-)configuration is not provided, and can be a value fixed as one from {1, 2, . . . , 7} if the (pre-)configuration is provided.

For yet another example, $P_{thres2}$ can use a default integer e.g., $P_{thres}$ can be 1, if a (pre-)configuration is not provided, and can be determined based on the (pre-)configuration, if the (pre-)configuration is provided.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may transmit the first set of sidelink signal(s)/channel(s) and drop the reception of the second set of sidelink signal(s)/channel(s), if $P_{TX,HARQ} \leq P_{RX,HARQ}$ (or $P_{TX,HARQ} < P_{RX,HARQ}$); and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may transmit the first set of sidelink signal(s)/channel(s) and drop the reception of the second set of sidelink signal(s)/channel(s), if $P_{TX,conflict} \leq P_{RX,conflict}$ (or $P_{TX,conflict} < P_{RX,conflict}$); and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may receive the second set of sidelink signal(s)/channel(s) and drop the transmission of the first set of sidelink signal(s)/channel(s), if $P_{RX,HARQ} \leq P_{TX,HARQ}$ (or $P_{RX,HARQ} < P_{TX,HARQ}$); and the UE may transmit the first set of sidelink signal(s)/channel(s) and drop the reception of the second set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may receive the second set of sidelink signal(s)/channel(s) and drop the transmission of the first set of sidelink signal(s)/channel(s), if $P_{RX,conflict} \leq P_{TX,conflict}$ (or $P_{RX,conflict} < P_{TX,conflict}$); and the UE may transmit the first set of sidelink signal(s)/channel(s) and drop the reception of the second set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may transmit the first set of sidelink signal(s)/channel(s) and drop the reception of the second set of sidelink signal(s)/channel(s), if $P_{TX,HARQ} - P_{RX,HARQ} \leq P_{thres,HARQ}$; and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may transmit the first set of sidelink signal(s)/channel(s) and drop the reception of the second set of sidelink signal(s)/channel(s), if $P_{TX,conflict}-P_{RX,conflict} \le P_{thres,conflict}$; and the UE may receive the second set of sidelink signal(s)/channel(s) and drop the transmission of the first set of sidelink signal(s)/channel(s), otherwise.

Figure 9:
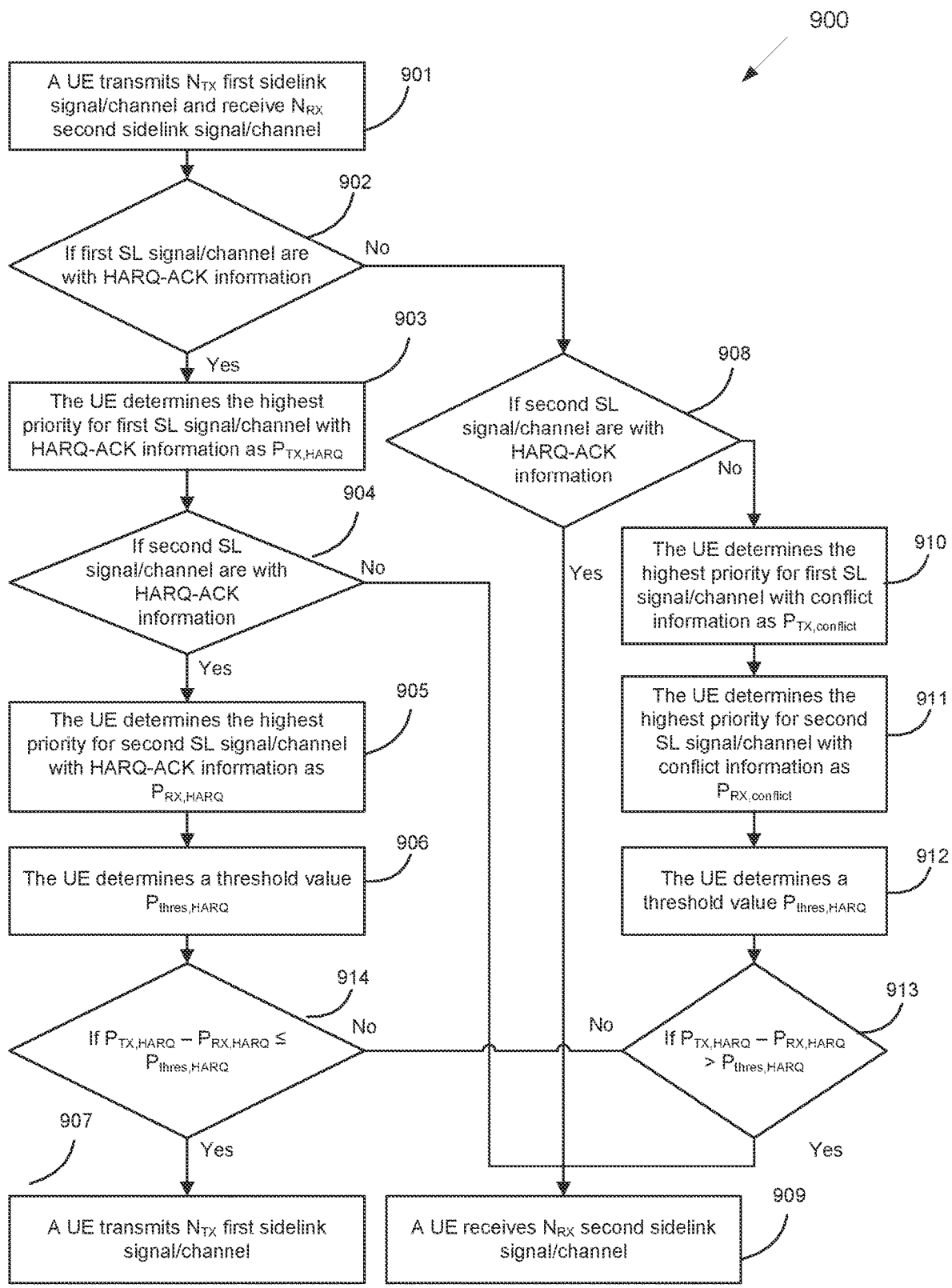
FIG. 9 illustrates a flowchart of UE procedure for determining transmission/reception based on SL priority according to embodiments of the present disclosure.

FIG. 9 illustrates a flowchart of UE procedure 900 for determining transmission/reception based on SL priority according to embodiments of the present disclosure. For example, the UE procedure 900 as may be performed by a UE such as 111-116 as illustrated in FIG. 1. An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, in step 901, a UE transmits $N_{TX}$ first sidelink signal/channel and receive $N_{RX}$ second sidelink signal/channel. In step 902, the UE determines if first SL signal/channel are with HARQ-ACK information. In step 903, the UE determines the highest priority for first SL signal/channel with HARQ-ACK information as $P_{TX,HARQ}$. In step 904, the UE determines if second SL signal/channel are with HARQ-ACK information. In step 905, the UE determines the highest priority for second SL signal/channel with HARQ-ACK information as $P_{RX,HARQ}$. In step 906, the UE determines a threshold value $P_{thres,HARQ}$. In step 914, the UE determines if $P_{TX,HARQ}-P_{RX,HARQ} \le P_{thres,HARQ}$ and if so, performs the SL transmission at step 907. In step 907, a UE would transmit $N_{TX}$ first sidelink signal/channel. In step 908, If second SL signal/channel are with HARQ-ACK information. In step 909, the UE receives $N_{RX}$ second sidelink signal/channel. In step 910, the UE determines the highest priority for first SL signal/channel with conflict information as $P_{TX,conflict}$. In step 911, The UE determines the highest priority for second SL signal/channel with conflict information as $P_{RX,conflict}$. In step 912, the UE determines a threshold value $P_{thres,HARQ}$. In step 913, the UE determines if $P_{TX,HARQ}-P_{RX,HARQ}>P_{thres,HARQ}$ and if so, performs the SL reception at step 909.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may receive the second set of sidelink signal(s)/channel(s) and drop the transmission of the first set of sidelink signal(s)/channel(s), if $P_{RX,HARQ}-P_{TX,HARQ} \le P_{thres,HARQ}$; and the UE may transmit the first set of sidelink signal(s)/channel(s) and drop the reception of the second set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may receive the second set of sidelink signal(s)/channel(s) and drop the transmission of the first set of sidelink signal(s)/channel(s), if $P_{TX,conflict}-P_{RX,conflict} \le P_{thres,conflict}$; and the UE may transmit the first set of sidelink signal(s)/channel(s) and drop the reception of the second set of sidelink signal(s)/channel(s), otherwise.

For one example, $P_{thres,HARQ}$ can be a non-positive integer fixed in the specification, e.g., $P_{thres,HARQ}$ can be a fixed value as 0, or −1, or −2, or −3, or −4, or −5, or −6, or −7.

For another example, $P_{thres,HARQ}$ can be a (pre-)configured non-positive integer, e.g., $P_{thres,HARQ}$ can be (pre-)configured from $\{0, -1, -2, \ldots, -7\}$.

For yet another example, $P_{thres,HARQ}$ can be an integer to be selected from two values subject to a (pre-)configuration, e.g., $P_{thres,HARQ}$ can be 1 is the (pre-)configuration is not provided, and can be a value fixed as one from $\{0, -1, -2, \ldots, -7\}$ if the (pre-)configuration is provided.

For yet another example, $P_{thres,HARQ}$ can use a default integer e.g., $P_{thres,HARQ}$ Can be 1, if a (pre-)configuration is not provided, and can be determined based on the (pre-)configuration, if the (pre-)configuration is provided.

For one example, $P_{thres,HARQ}$ can be a positive integer fixed in the specification, e.g., $P_{thres,HARQ}$ can be a fixed value as 1, or 2, or 3, or 4, or 5, or 6, or 7.

For another example, $P_{thres,HARQ}$ can be a (pre-)configured positive integer, e.g., $P_{thres,HARQ}$ can be (pre-)configured from $\{1, 2, \ldots, 7\}$.

For yet another example, $P_{thres,HARQ}$ can be an integer to be selected from two values subject to a (pre-)configuration, e.g., $P_{thres,HARQ}$ can be −1 is the (pre-)configuration is not provided, and can be a value fixed as one from $\{1, 2, \ldots, 7\}$ if the (pre-)configuration is provided.

For yet another example, $P_{thres,HARQ}$ can use a default integer e.g., $P_{thres,HARQ}$ can be −1, if a (pre-)configuration is not provided, and can be determined based on the (pre-)configuration, if the (pre-)configuration is provided.

For one example, $P_{thres,conflict}$ can be a non-positive integer fixed in the specification, e.g., $P_{thres,conflict}$ can be a fixed value as −1, or −2, or −3, or −4, or −5, or −6, or −7.

For another example, $P_{thres,conflict}$ can be a (pre-)configured non-positive integer, e.g., $P_{thres,conflict}$ can be (pre-)configured from {−1, −2, . . . , −7}.

For yet another example, $P_{thres,conflict}$ can be an integer to be selected from two values subject to a (pre-)configuration, e.g., $P_{thres,conflict}$ can be 1 is the (pre-)configuration is not provided, and can be a value fixed as one from {−1, −2, . . . , −7} if the (pre-)configuration is provided.

For yet another example, $P_{thres,conflict}$ can use a default integer e.g., $P_{thres,conflict}$ can be 1, if a (pre-)configuration is not provided, and can be determined based on the (pre-)configuration, if the (pre-)configuration is provided.

For one example, $P_{thres,conflict}$ can be a positive integer fixed in the specification, e.g., $P_{thres,conflict}$ can be a fixed value as 1, or 2, or 3, or 4, or 5, or 6, or 7.

For another example, $P_{thres,conflict}$ can be a (pre-)configure positive integer, e.g., $P_{thres,conflict}$ can be (pre-)configured from {1, 2, . . . , 7}.

For yet another example, $P_{thres,conflict}$ can be an integer to be selected from two values subject to a (pre-)configuration, e.g., $P_{thres,conflict}$ can be −1 is the (pre-)configuration is not provided, and can be a value fixed as one from {1, 2, . . . , 7} if the (pre-)configuration is provided.

For yet another example, $P_{thres,conflict}$ can use a default integer e.g., $P_{thres,conflict}$ can be −1, if a (pre-)configuration is not provided, and can be determined based on the (pre-)configuration, if the (pre-)configuration is provided.

For one example, $P_{thres,HARQ}=P_{thres,conflict}$.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may transmit the first set of sidelink signal(s)/channel(s) and drop the reception of the second set of sidelink signal(s)/channel(s), if $P_{TX,HARQ} \leq P_{thres,HARQ}$; and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$),
and none of the second set of sidelink signal(s)/channel(s) are with HARQ-ACK information (denote the highest priority value of the first set of sidelink signal(s)/channel(s) with conflict information as $P_{RX,conflict}$), then the UE may transmit the first set of sidelink signal(s)/channel(s) and drop the reception of the second set of sidelink signal(s)/channel(s), if $P_{TX,conflict} \leq P_{thres,conflict}$; and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may receive the second set of sidelink signal(s)/channel(s) and drop the transmission of the first set of sidelink signal(s)/channel(s), if $P_{RX,HARQ} \leq P_{thres,HARQ}$; and the UE may transmit the first set of sidelink signal(s)/channel(s) and drop the reception of the second set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may receive the second set of sidelink signal(s)/channel(s) and drop the transmission of the first set of sidelink signal(s)/channel(s), if $P_{RX,conflict} \leq P_{thres,conflict}$; and the UE may transmit the first set of sidelink signal(s)/channel(s) and drop the reception of the second set of sidelink signal(s)/channel(s), otherwise.

For one example, $P_{thres,HARQ}$ can be a positive integer fixed in the specification, e.g., $P_{thres,HARQ}$ can be a fixed value as 1, or 2, or 3, or 4, or 5, or 6, or 7, or 8. For one instance, $P_{thres,HARQ}=8$ is equivalent as no requirement on the priority of the first set of sidelink signal(s)/channel(s).

For another example, $P_{thres,HARQ}$ can be a (pre-)configured positive integer, e.g., $P_{thres,HARQ}$ can be (pre-)configured from {1, 2, . . . , 7, 8}.

For yet another example, $P_{thres,HARQ}$ can use a default integer e.g., $P_{thres,HARQ}$ can be 8, if a (pre-)configuration is not provided, and can be determined based on the (pre-)configuration, if the (pre-)configuration is provided.

For one example, $P_{thres,conflict}$ can be a positive integer fixed in the specification, e.g., $P_{thres,conflict}$ can be a fixed value as 1, or 2, or 3, or 4, or 5, or 6, or 7, or 8. For one instance, $P_{thres,conflict}=8$ is equivalent as no requirement on the priority of the first set of sidelink signal(s)/channel(s).

For another example, $P_{thres,conflict}$ can be a (pre-)configured positive integer, e.g., $P_{thres,conflict}$ can be (pre-)configured from $\{1, 2, \ldots, 7, 8\}$.

For yet another example, $P_{thres,conflict}$ can use a default integer e.g., $P_{thres,conflict}$ can be 8, if a (pre-)configuration is not provided, and can be determined based on the (pre-)configuration, if the (pre-)configuration is provided.

For one example, $P_{thres,HARQ}=P_{thres,conflict}$.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and one or more of the second set of sidelink signal(s)/channel(s) are with HARQ-ACK information (denote the highest priority value of the second set of sidelink signal(s)/channel(s) with HARQ-ACK information as $P_{RX,HARQ}$), then the UE may transmit the first set of sidelink signal(s)/channel(s) and drop the reception of the second set of sidelink signal(s)/channel(s), if $P_{TX,HARQ} \leq P_{thres,HARQ1}$ and/or $P_{TX,HARQ}-P_{RX,HARQ} \leq P_{thres,HARQ2}$; and the UE may receive the second set of sidelink signal(s)/channel(s) and drop the transmission of the first set of sidelink signal(s)/channel(s), otherwise.

In one embodiment, if one or more of the first set of sidelink signal(s)/channel(s) are with HARQ-ACK information (denote the highest priority value of the first set of sidelink signal(s)/channel(s) with HARQ-ACK information as $P_{TX,HARQ}$), and none of the second set of sidelink signal(s)/channel(s) are with HARQ-ACK information, then the UE may transmit the first set of sidelink signal(s)/channel(s) and drop the reception of the second set of sidelink signal(s)/channel(s).

In one embodiment, if one or more of the second set of sidelink signal(s)/channel(s) are with HARQ-ACK information (denote the highest priority value of the second set of sidelink signal(s)/channel(s) with HARQ-ACK information as $P_{RX,HARQ}$), and none of the first set of sidelink signal(s)/channel(s) are with HARQ-ACK information, then the UE may receive the second set of sidelink signal(s)/channel(s) and drop the transmission of the first set of sidelink signal(s)/channel(s).

In one embodiment, if none of the first set of sidelink signal(s)/channel(s) are with HARQ-ACK information (denote the highest priority value of the first set of sidelink signal(s)/channel(s) with conflict information as $P_{TX,conflict}$), and none of the second set of sidelink signal(s)/channel(s) are with HARQ-ACK information (denote the highest priority value of the first set of sidelink signal(s)/channel(s) with conflict information as $P_{RX,conflict}$), then the UE may receive the second set of sidelink signal(s)/channel(s) and drop the transmission of the first set of sidelink signal(s)/channel(s), if $P_{RX,conflict} \leq P_{thres,conflict1}$ and/or $P_{RX,conflict}-P_{TX,conflict} \leq P_{thres,conflict2}$; and the UE may transmit the first set of sidelink signal(s)/channel(s) and drop the reception of the second set of sidelink signal(s)/channel(s), otherwise.

For one example, $P_{thres,HARQ1}$ can be determined according to at least one example for $P_{thres,HARQ}$.

For another example, $P_{thres,HARQ2}$ can be determined according to at least one example for $P_{thres,HARQ}$.

For one example, $P_{thres,conflict1}$ can be determined according to at least one example for $P_{thres,conflict}$.

For another example, $P_{thres,conflict1}$ can be determined according to at least one example for $P_{thres,conflict}$.

For one example, $P_{thres,HARQ1}=P_{thres,conflict1}$.

For another example, $P_{thres,HARQ2}=P_{thres,conflict2}$.

In one embodiment, if the UE may transmit the first set of sidelink signal(s)/channel(s), the UE first transmits the ones with HARQ-ACK information according to the highest priority to a lowest priority, and then transmit the ones with conflict information according to a highest priority to a lowest priority, wherein the overall number of transmission can be subject to a maximum limit and/or the overall transmission power can be subject to a maximum limit.

In another embodiment, if the UE may receive the second set of sidelink signal(s)/channel(s), the UE first receives the ones with HARQ-ACK information, and then receives the ones with conflict information, wherein the overall number of receptions can be potentially subject to a UE capability, if provided.

In yet another embodiment, $P_{thres}$, $P_{thres,HARQ}$, or $P_{thres,conflict}$ can be supported separately based on the type of signal(s)/channel(s) as described in the examples of this embodiment.

In one embodiment, a priority of a sidelink signal/channel (e.g., transmission priority) can be adapted based on the index of the transmission occasion associated with the sidelink signal/channel.

In one example, a priority value of a sidelink signal/channel (e.g., transmission priority value) can decrease (e.g., to be a higher priority) based on the index of the transmission occasion associated with the sidelink signal/channel.

For one instance, the priority value of the sidelink signal/channel (e.g., transmission priority value) decreases e.g., by 1, until achieving the highest priority, e.g., when a channel access procedure fails for one transmission occasion and the UE intends to perform the transmission in a next transmission occasion.

For another instance, the priority value of the sidelink signal/channel (e.g., transmission priority value) can be set to 1 (e.g., corresponding to the highest priority), e.g., when a channel access procedure fails for one transmission occasion and the UE intends to perform the transmission in a next transmission occasion.

For yet another instance, the priority value of the sidelink signal/channel (e.g., transmission priority value) can be set to a value P, e.g., when a channel access procedure fails for one transmission occasion and the UE intends to perform the transmission in a next transmission occasion. For one instance, the value P can be fixed in the specification. For another instance, the value P can be (pre-)configured.

In one example, a priority value of a sidelink signal/channel (e.g., transmission priority value) can increase (e.g., to be a lower priority) based on the index of the transmission occasion associated with the sidelink signal/channel.

For one instance, the priority value of the sidelink signal/channel (e.g., transmission priority value) increases e.g., by 1, until achieving the lowest priority, e.g., if the transmission fails at one of its associated transmission occasion.

For another instance, the priority value of the sidelink signal/channel (e.g., transmission priority value) can be set to 8 (e.g., corresponding to the lowest priority), e.g., if the transmission fails at one of its associated transmission occasion (e.g., first transmission occasion).

For yet another instance, the priority value of the sidelink signal/channel (e.g., transmission priority value)can be set to a value P, e.g., if the transmission fails at one of its associated transmission occasion (e.g., first transmission occasion). For one instance, the value P can be fixed in the specification. For another instance, the value P can be (pre-)configured.

In one example, embodiments and/or examples of the present disclosure can be applicable when the sidelink signal/channel is PSSCH/PSCCH.

In another example, embodiment and/or example of the present disclosure can be applicable when the sidelink signal/channel is PSFCH.

In yet another example, embodiments and/or examples of the present disclosure can be applicable when the sidelink signal/channel is S-SS/PSBCH block.

In yet another example, embodiments and/or examples of the present disclosure can be applicable when the sidelink signal/channel is CSI-RS.

In yet another example, embodiments and/or examples of the present disclosure can be applicable when the sidelink signal/channel is PT-RS.

In yet another example, embodiments and/or examples of the present disclosure can be applicable when the sidelink signal/channel is S-PRS.

In yet another example, embodiments and/or examples of the present disclosure can be applicable when the sidelink signal/channel is multiplexed from PSSCH and PSCCH.

In yet another example, embodiments and/or examples of the present disclosure can be applicable when the sidelink signal/channel is PSFCH multiplexed from at least one of PSSCH or PSCCH.

In yet another example, embodiments and/or examples of the present disclosure can be applicable when the sidelink signal/channel is CSI-RS multiplexed from at least one of PSSCH or PSCCH.

In yet another example, embodiments and/or examples of the present disclosure can be applicable when the sidelink signal/channel is PT-RS multiplexed from at least one of PSSCH or PSCCH.

In yet another example, embodiments and/or examples of the present disclosure can be applicable when the sidelink signal/channel is S-PRS multiplexed from at least one of PSSCH or PSCCH.

In yet another example, embodiments and/or examples of the present disclosure can be applicable when the sidelink signal/channel is S-PRS multiplexed with S-SS/PSBCH block.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a processor configured to:
   determine a type of a sidelink (SL) channel access procedure before a SL transmission, wherein the type of the SL channel access procedure is a Type 1 SL channel access procedure or a Type 2 SL channel access procedure;
   determine, based on a type of the SL transmission, a channel access priority class (CAPC) when the type of the SL channel access procedure is the Type 1 SL channel access procedure, wherein the CAPC is associated with a parameter p; and
   perform, based on the type of the SL channel access procedure and the CAPC, the SL channel access procedure before the SL transmission;
   determine p=1 when the type of the SL transmission comprises one or more SL synchronization signals and a physical SL broadcast channel (S-SS/PBSCH) block, wherein p=1 corresponds to a highest CAPC; and a transceiver operably coupled to the processor, the transceiver configured to perform the SL transmission if the SL channel access procedure is successfully performed.

2. The UE of claim 1, wherein the Type 1 SL channel access procedure includes a random time duration spanned by sensing slots that are sensed to be idle before the SL transmission.

3. The UE of claim 1, wherein the Type 2 SL channel access procedure includes a deterministic time duration spanned by sensing slots that are sensed to be idle before the SL transmission.

4. The UE of claim 1, wherein:
the parameter p∈{1, 2, 3, 4},
and
p=4 corresponds to a lowest CAPC.

5. The UE of claim 1, wherein the one or more SL synchronization signals and the S-SS/PSBCH block are multiplexed.

6. The UE of claim 1, wherein the processor is further configured to determine p=1, when the type of the SL transmission is a physical SL feedback channel (PSFCH).

7. The UE of claim 1, wherein:
the processor is further configured to determine to perform at least one of the SL transmission and a SL reception in a slot; and
the transceiver is further configured to perform the SL reception in the slot if the SL channel access procedure is not successfully performed.

8. The UE of claim 1, wherein the processor is further configured to determine whether to perform, based on a first priority ($P_{TX}$) for the SL transmission and a second priority ($P_{RX}$) for the SL reception, a SL reception in a slot if the SL channel access procedure is successfully performed.

9. The UE of claim 8, wherein the processor is further configured to:
determine to perform the SL transmission in the slot when $P_{TX}-P_{RX} \leq P_{thres}$, and determine to perform the SL reception in the slot when $P_{TX}-P_{RX} > P_{thres}$, and
wherein $P_{thres}$ is a threshold priority.

10. The UE of claim 9, wherein:
$P_{TX} \in \{1, 2, \ldots, 8\}$,
$P_{RX} \in \{1, 2, \ldots, 8\}$,
a value of 1 corresponds to a highest SL priority, and
a value of 8 corresponds to a lowest SL priority.

11. A method of a user equipment (UE) in a wireless communication system, the method comprising:
determining a type of a sidelink (SL) channel access procedure before a SL transmission, wherein the type of the SL channel access procedure is a Type 1 SL channel access procedure or a Type 2 SL channel access procedure;
determining, based on a type of the SL transmission, a channel access priority class (CAPC) when the type of the SL channel access procedure is the Type 1 SL channel access procedure, wherein the CAPC is associated with a parameter p;
performing, based on the type of the SL channel access procedure and the CAPC, the SL channel access procedure before the SL transmission;
performing the SL transmission or a SL reception if the SL channel access procedure is successfully performed; and
determining p=1 when the type of the SL transmission comprises one or more SL synchronization signals and a physical SL broadcast channel (S-SS/PBSCH) block, wherein p=1 corresponds to a highest CAPC.

12. The method of claim 11, wherein the Type 1 SL channel access procedure includes a random time duration spanned by sensing slots that are sensed to be idle before the SL transmission.

13. The method of claim 11, wherein the Type 2 SL channel access procedure includes a deterministic time duration spanned by sensing slots that are sensed to be idle before the SL transmission.

14. The method of claim 11, wherein:
the parameter p∈{1, 2, 3, 4},
and
p=4 corresponds to a lowest CAPC.

15. The method of claim 11, wherein the SL synchronization signals and the S-SS/PSBCH block are multiplexed.

16. The method of claim 11, further comprising determining p=1, when the type of the SL transmission is a physical SL feedback channel (PSFCH).

17. The method of claim 11, further comprising:
determining to perform at least one of the SL transmission and a SL reception in a slot; and
performing the SL reception in the slot if the SL channel access procedure is not successfully performed.

18. The method of claim 11, further comprising determining whether to perform, based on a first priority ($P_{TX}$) for the SL transmission and a second priority ($P_{RX}$) for the SL reception, a SL reception in a slot based on the SL channel access procedure being successfully performed.

19. The method of claim 18, further comprising:
determining to perform the SL transmission in the slot when $P_{TX}-P_{RX} \leq P_{thres}$, and determining to perform the SL reception in the slot when $P_{TX}-P_{RX} > P_{thres}$,
wherein $P_{thres}$ is a threshold priority.

20. The method of claim 19, wherein:
$P_{TX} \in \{1, 2, \ldots, 8\}$,
$P_{RX} \in \{1, 2, \ldots, 8\}$,
a value of 1 corresponds to a highest SL priority, and
a value of 8 corresponds to a lowest SL priority.

* * * * *